United States Patent [19]

Mita et al.

[11] 4,420,420

[45] Dec. 13, 1983

[54] RHODIUM CATALYST AND METHOD FOR PREPARING THE SAME

[75] Inventors: Yukimitsu Mita, Oita; Ken-ichi Sano, Kawasaki; Shinya Matsuhira; Tetsuo Nakajo, both of Oita, all of Japan

[73] Assignee: Showa Denko Kabushiki Kaisha, Tokyo, Japan

[21] Appl. No.: 398,181

[22] Filed: Jul. 14, 1982

Related U.S. Application Data

[62] Division of Ser. No. 254,074, Apr. 14, 1981, Pat. No. 4,376,724.

[30] Foreign Application Priority Data

Apr. 14, 1980 [JP] Japan .................................. 55-48131
Apr. 14, 1980 [JP] Japan .................................. 55-48132

[51] Int. Cl.$^3$ ........................ B01J 21/06; B01J 23/46
[52] U.S. Cl. ................................. 502/261; 502/301; 502/316; 502/325
[58] Field of Search ................... 252/460, 472, 477 R

[56] References Cited

U.S. PATENT DOCUMENTS 2,331,915 10/1943 Kirkpatrick .................... 252/460 X
2,623,860 12/1952 Haensel ........................... 252/460 X
3,259,589 7/1966 Michalko ........................ 252/460 X Primary Examiner—Carl F. Dees
Attorney, Agent, or Firm—Armstrong, Nikaido, Marmelstein & Kubovcik

[57] ABSTRACT

A rhodium catalyst containing supported rhodium metal omnipresent in the surface layer or in the neighborhood of the surface layer of the particles of a silica or titania type support is presented. This catalyst is prepared by a method (i) in which the support is dipped into an aqueous solution of a water-soluble rhodium salt previously adjusted to pH of at least 10, followed by the drying and reduction, or a method (ii) in which the support is first dipped into an aqueous solution of a water-soluble rhodium salt having a pH of 1 or less and, then, dipped into an aqueous alkaline solution containing an alkaline compound in an amount sufficient to neutralize the acid impregnated in the support and also sufficient to convert the rhodium salt impregnated in the support into rhodium hydroxide, followed by the drying and reduction.

4 Claims, 6 Drawing Figures

RHODIUM CATALYST AND METHOD FOR PREPARING THE SAME

This is a division, of application Ser. No. 254,074, filed Apr. 14, 1981 now U.S. Pat. No. 4,376,724.

BACKGROUND OF THE INVENTION

1. Field of the Invention

The present invention relates to a rhodium catalyst containing supported rhodium metal omnipresent in the surface layer or in the neighborhood of the surface layer of the particles of a silica type or titania type support. The present invention also relates to a method for preparing a rhodium catalyst containing supported rhodium metal omnipresent in the surface layer or in the neighborhood of the surface layer of the particles of a silica type or titania type support.

2. Description of the Prior Art

Catalysts containing noble metals, such as, platinum, palladium, rhodium and the like, supported on porous inorganic supports are heretofore widely used as catalysts for various reactions in the industry. In most reactions, the reactions substantially proceed in the outer surfaces or in the surface layers of the catalyst particles and the noble metals supported in the interior portions of the catalyst particles are not usually concerned with the reactions. Therefore, since the impregnation of the valuable and costly noble metals into the interior portions of the catalyst particles is not economical, it is desired in the art that the noble metals are supported only in the surface or in the neighborhood of the surface of the support particles.

For instance, it is disclosed in Japanese Patent Publication No. 47-35670/1972 that a palladium catalyst containing palladium metal supported on the surface of support particles is prepared by impregnating the surface of support particles with a palladium salt after adjusting an aqueous acidic solution of the palladium salt to a pH of 2.8 to 4.8 by the addition of an alkali carbonate and, then, reducing the impregnated support particles. It is reported that the catalyst containing palladium supported only in the surface layer of the support has a high activity as compared with catalysts containing palladium substantially uniformly distributed in the entire portions including the interior portions of support particles.

Furthermore, it is also disclosed in Japanese Patent Publication No. 48-10135/1973 that vinyl acetate is prepared by using a catalyst containing 90% or more of palladium deposited on the surface of support particles and that excellent reaction results can be obtained by the use of this catalyst, as compared with the use of catalysts in which palladium is impregnated into the depths of support particles. It is reported that the catalyst containing 90% or more of palladium supported on the surface of the support is prepared by first depositing 0.001 to 0.2% by weight, based on the support, of an appropriate reduced metal (e.g. palladium metal) on the support and, then, depositing a necessary amount of a palladium-catalyst component thereon.

Thus, it is already known in the art that the use of a catalyst containing a noble metal catalyst component supported in the surface layer or in the neighborhood of the surface layer of porous support particles results in a remarkably high catalytic efficiency (e.g. a yield based on the unit weight of the catalyst), as compared with the use of conventional catalysts having a catalyst component impregnated into the interior portions or the depths of the support particles. It is also known that the use of a catalyst containing a noble metal catalyst component supported in the surface layer or in the neighborhood of the surface layer of the support particles remarkably decreases the catalyst cost, due to the fact that the catalyst component contained in the interior portions of the support particles, which does not effectively catalyze the reaction, is not present.

Catalysts containing rhodium supported on porous supports are heretofore used in the synthesis of oxygen-containing compounds, such as, ethylene glycol, ethanol, acetaldehyde, acetic acid and the like, from synthesis gas (i.e. gas mainly containing hydrogen and carbon monoxide), in the purification of automotive exhaust gas, and various hydrogenation reaction, such as, for example, the selective hydrogenation of carbonyl groups of aldehydes, ketones and the like, in the nuclear hydrogenation of aromatic compounds, and in the hydrogenation of the unsaturated bonds of olefins, acetylene, nitriles and the like. Rhodium is a noble metal mainly derived from platinum ore. Therefore, the use of a catalyst containing rhodium substantially supported in the surface layer or in the neighborhood of the surface layer of support particles is also desirable from the point of view of not only the improvement in the catalytic efficiency, but also the decrease in the catalyst cost, as in the case of platinum and palladium catalysts. However, in the case where a silica type or titania type support is used, it is not possible to prepare a rhodium catalyst containing rhodium substantially supported in the surface layer or in the neighborhood of the surface layer of the support particles by using a conventional catalyst preparation method. This is also true when the above-mentioned methods for preparing the palladium or platinum catalysts containing the catalytic component substantially supported on the surface of the support particles are used.

SUMMARY OF THE INVENTION

Accordingly, an object of the present invention is to provide a rhodium catalyst containing rhodium metal substantially supported in the surface layer or in the neighborhood of the surface layer of the particles of a silica type or titania type support.

Another object of the present invention is to provide a method for preparing a rhodium catalyst containing rhodium metal omnipresent in the surface layer or in the neighborhood of the surface layer of the particles of a silica type or titania type support.

Other objects and advantages of the present invention will be apparent from the following description.

In accordance with the present invention, there is provided a rhodium catalyst comprising active rhodium metal supported on a silica type or titania type support, said active rhodium being omnipresent in the surface layer or in the neighborhood of the surface of the particles of the support.

In accordance with the present invention, there is also provided a method for preparing a rhodium catalyst containing rhodium metal omnipresent in the surface layer or in the neighborhood of the surface layer of the particles of a support, said method comprising the steps of:

(i) adding sodium hydroxide or potassium hydroxide to an aqueous solution of a water-soluble rhodium salt to adjust the pH of the aqueous solution to at least 10, whereby said water-soluble rhodium salt is converted to rhodium hydroxide;

(ii) dipping a silica type or titania type support into said aqueous solution of rhodium hydroxide; and (iii) drying and reducing the support impregnated such rhodium hydroxide, whereby the impregnated rhodium hydroxide is reduced to rhodium metal.

In accordance with the present invention, there is further provided a method for preparing a rhodium catalyst containing rhodium metal omnipresent in the surface layer or in the neighborhood of the surface layer of the particles of a support, said method comprising the steps of:

(i) adding a mineral acid to an aqueous solution of a water-soluble rhodium salt to adjust the pH of the aqueous solution to not more than 1;

(ii) dipping a silica type or titania type support into said aqueous solution having a pH of not more than 1;

(iii) dipping the support impregnated with a rhodium salt into an aqueous alkaline solution containing an alkaline compound in an amount at least equivalent to theoretically neutralize the acid impregnated in the support and to theoretically convert the rhodium salt impregnated in the support into rhodium hydroxide and, (iv) drying and reducing the support impregnated with the rhodium hydroxide, whereby the impregnated rhodium hydroxide is reduced to rhodium metal.

BRIEF DESCRIPTION OF THE DRAWINGS

The present invention will be better understood from the description set forth below with reference to the accompanying drawings, in which.

DETAILED DESCRIPTION OF THE INVENTION

The water-soluble salts of rhodium used in the present invention include those which are used in the preparation of conventional rhodium catalysts. Typical examples of such compounds are rhodium chloride, rhodium bromide, rhodium iodide, rhodium nitrate, rhodium sulfate and rhodium acetate. These compounds can be used alone or in any mixtures thereof.

The silica type or titania type support used in the present invention includes a silica or titania support containing a single component, as well as supports comprising any mixtures or compound oxides containing, as a main constituent, silica or titania. Examples of the other constituents of the mixtures or compound oxides are alumina, magnesia, thoria, zirconia and the like.

In accordance with the first embodiment of the present invention, the above-mentioned rhodium salt is first dissolved in water to form an aqueous solution thereof and, then, sodium hydroxide or potassium hydroxide is gradually added to the solution so as to adjust the pH of the aqueous solution to at least 10, more preferably 12 to 14. Thus, the rhodium salt is converted into rhodium hydroxide.

Subsequently, a silica type or titania type support in the form of particles is dipped into the aqueous solution obtained above in a conventional manner. Thus, the aqueous solution of the rhodium hydroxide is impregnated in the inside of the pores of the porous support particles.

The support impregnated with the rhodium hydroxide is, then, dried and reduced in a conventional manner. For instance, after the support particles are taken out of the rhodium-containing aqueous solution and the aqueous solution attached to the support particles is removed from the support particles, the support particles are air dried and, then, optionally dried in a dryer. However, it should be noted that rapid drying at a high temperature is not desirable due to the facts that the agglomeration or crystallization of the impregnated rhodium particles is accelerated and that the uniform distribution of the rhodium, as a fine particle, in the resultant catalyst is prevented. Therefore, the drying is generally carried out under a relatively mild condition, for example, at a temperature of about 150° C. or less, more preferably, 50° to 150° C.

Figure 1:
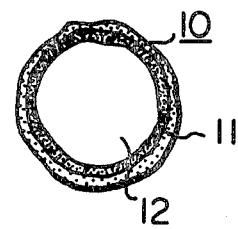
FIG. 1 is a schematical cross-sectional view illustrating the rhodium metal distribution of the catalyst obtained in Example 1 below, which is observed by using a light microscope (magnified 5 times)
Figure 2:
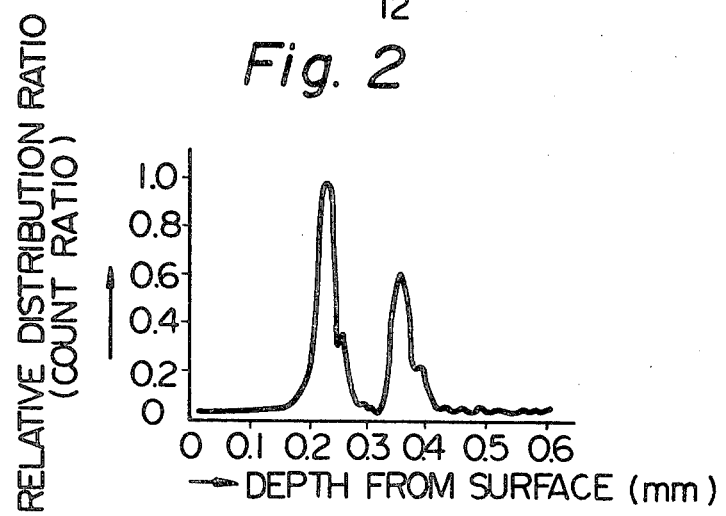
FIG. 2 is a graph illustrating the rhodium metal distribution of the catalyst obtained in Example 1 below, which is analyzed by using an electron probe micro analyzer.

The dried support particles thus obtained are then reduced, for example, at a temperature of 50° to 500° C., in a hydrogen gas atmosphere or stream. Thus, the desired rhodium catalyst containing supported rhodium metal omnipresent, as, for example, a ring layer, in the neighborhood of the surface of the support particles, is obtained, as illustrated in FIGS. 1 and 2. As a reducing treatment method, in addition to the above-mentioned method, other various conventional reduction methods conventionally used in the preparation of metal catalysts, for example, the reduction method by using hydrazine, formalin, methanol vapor or the like, can be used in the practice of the present invention.

As mentioned hereinabove, the essence of the first embodiment of the method according to the present invention resides in the facts that the alkali is added to the aqueous solution of the water-soluble rhodium salt to adjust the pH of the solution to 10 or more, prior to the dipping of the silica type or titania type support into the rhodium-containing aqueous solution, and, then, the support is reduced. Contrary to this, in the case where the alkali is added to the rhodium-containing aqueous solution or the impregnated support is treated with the alkali, after the support is dipped into an aqueous solution of a rhodium compound having a pH of less than 10, the desired catalyst containing rhodium metal omnipresent in the surface layer or in the neighborhood of the surface layer of the support particles cannot be obtained.

In accordance with the second embodiment of the present invention, the above-mentioned rhodium salt is first dissolved in water to form an aqueous solution thereof and, then, a mineral acid such as hydrochloric acid, nitric acid, sulfuric acid and the like is added to the solution so as to adjust the pH of the aqueous solution to 1 or less. It should be noted that, since the use of a mineral acid having a high concentration tends to attack the support itself and the mechanical strength of the support is decreased, the concentration of the mineral acid is preferably 10% by weight or less.

Subsequently, a silica type or titania type support in the form of particles is dipped into the aqueous solution obtained above in a conventional manner. Thus, the aqueous solution of the rhodium hydroxide is impregnated in the inside of the pores of the porous support particles.

The support particles impregnated with the aqueous rhodium salt solution are taken out of the aqueous solution. After removing the aqueous solution form the support particles, the support particles are air dried. The support particles are then dipped into an aqueous alkaline solution containing an appropriate alkaline compound, such as, sodium hydroxide, potassium hydroxide, lithium hydroxide, rubidium hydroxide, cesium hydroxide, sodium cabonate, potassium carbonate, sodium bicarbonate, potassium bicarbonate and calcium hydroxide. These alkaline compounds can be used alone or in any mixture thereof. The amount of the alkaline compound to be used in this aqueous solution must be an amount at least equivalent to theoretically neutralize the acid impregnated in the support and equivalent to theoretically convert the rhodium salt impregnated in the support into rhodium hydroxide. However, in the case where the amount of the alkaline compound is too large, the rhodium impregnated in the support is likely to be eluted from the support. Therefore, the alkaline compound is generally used in an amount of 1.0 to 3.0 times, more preferably, 1.2 to 2.0 times, of the theoretical equivalent amount.

The support is then dried and reduced in a conventional manner, after dipping the support into the aqueous alkaline solution. For instance, after the support particles are taken out of the rhodium-containing aqueous solution and the aqueous solution attached to the support particles is removed from the support particles, the support particles are air dried and, then, optionally dried in a dryer. However, it should be noted, as in the case of the above-mentioned first embodiment, that the rapid drying at a high temperature is not desirable, due to the facts that the agglomeration or crystallization of the impregnated rhodium particles is accelerated and that the uniform distribution of the rhodium, as a fine particle, in the resultant catalyst is prevented. Therefore, the drying is generally carried out under a relatively mild condition, for example, at a temperature of about 150° C. or less, more preferably, 50° to 150° C.

Figure 3:
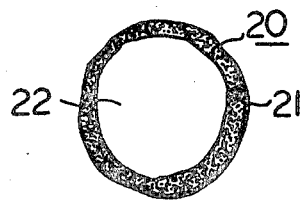
FIG. 3 is a schematical cross-sectional view illustrating the rhodium metal distribution of the catalyst obtained in Example 8 below, which is observed by using a light microscope (magnified 5 times)
Figure 4:
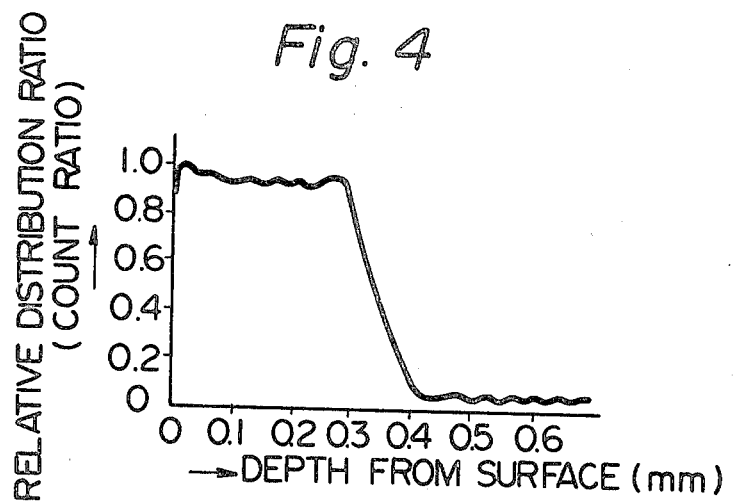
FIG. 4 is a graph illustrating the rhodium metal distribution of the catalyst obtained in Example 8 below, which is analyzed by using an electron probe micro analyzer.

The dried support particles thus obtained are then reduced, for example, at a temperature of 50° to 500° C., in a hydrogen gas atmosphere or stream. Thus, the desired rhodium catalyst containing supported rhodium metal omnipresent in the surface layer or in the neighborhood of the surface layer of the support particles is obtained, as illustrated in FIGS. 3 and 4. As a reducing treatment method, in addition to the above-mentioned method, other various conventional reduction methods conventionally used in the preparation of metal catalysts, for example, the reduction method by using hydrazine, formalin, methanol vapor or the like, can be used in the practice of the present invention.

As mentioned hereinabove, the essence of the second embodiment of the method according to the present invention resides in the facts that the silica type or titania type support is impregnated with the aqueous rhodium salt solution by dipping the support into the aqueous rhodium salt solution having a pH of 1.0 or less and, then, the impregnated support is treated with the alkali prior to the reduction thereof. Contrary to this, in the case where the pH of an aqueous rhodium salt solution into which a silica type or titania type support is dipped is more than 1.0, the desired catalyst containing rhodium metal omnipresent in the surface layer or in the neighborhood of the surface layer of the support particles cannot be obtained, even when the impregnated support is treated with the alkali. Furthermore, in the case where no alkali treatment is carried out prior to the reduction of the impregnated support, the desired catalyst containing rhodium metal omnipresent in the surface layer or in the neighborhood of the surface layer of the support particles cannot be obtained.

As mentioned hereinabove, the rhodium catalyst according to the present invention contains supported rhodium metal omnipresent in the surface layer or in the neighborhood of the surface layer of the support particles. Therefore, when the rhodium catalyst of the present invention is used in the various reactions, using rhodium catalysts, mentioned hereinabove, the catalytic efficiency (e.g. the yield of the desired product based on the unit weight of the catalyst) is remakably increased and the catalyst cost is remarkably decreased. Thus, the rhodium catalyst according to the present invention is extremely advantageous from the industrial point of view. Although it is explained in detail hereinbefore that the rhodium is supported on a silica type or titania type support, it should be noted that the present invention can be applied to the case where the other component or components, in addition to the rhodium, are supported, as a co-catalyst, on the support. For instance, co-catalyst components including alkaline earth metals, such as calcium, magnesium, barium and the like, noble metals, such as platinum, palladium, iridium, ruthenium, gold and the like, iron, nickel, cobalt, cerium, manganese and other metals as well as various salts are first supported on a silica type or titania type support in a conventional manner and, then, rhodium metal is supported in the surface layer or in the neighborhood of the surface layer of the support particles; or vice versa. Alternately, an aqueous rhodium-containing solution further containing the co-catalyst component can also be used as the impregnation liquid in the present invention.

EXAMPLES

The present invention will now be further illustrated by, but is by no means limited to, the following Examples and Comparative Examples, in which all percentages are expressed on a weight basis unless otherwise specified.

EXAMPLE 1

Rhodium metal was supported on a silica support having a bulk density of 0.5733 kg/liter, a diameter of about 5 mm, a specific surface area of 150 m$^2$/g and a pore volume of 0.55 ml/g as follows.

20.7 ml of an aqueous solution of $RhCl_3.3H_2O$ (the content of the rhodium metal in the solution was 15.68 g/liter) was placed in a 100 ml beaker. To this solution, 7 ml of a 40% aqueous sodium hydroxide solution was dropwise added under stirring to form a uniform solution and, then, pure water was added thereto until the total volume of the solution became 38.5 ml. The pH of the solution was about 14. Into the aqueous solution of rhodium hydroxide thus prepared, 100 ml of the above-mentioned silica support was dipped and thoroughly agitated. Thus, the silica support was impregnated with the aqueous solution of rhodium hydroxide.

The silica support impregnated with rhodium was then taken out of the beaker. After air drying, the support was dried at a temperature of 150° C. for 3 hours in an air bath. The rhodium impregnated silica support thus dried was reduced at a temperature of 300° C. in a hydrogen atmosphere, while hydrogen gas was passed through the system. Thus, a rhodium catalyst containing rhodium metal supported on the silica support was obtained. The content of the rhodium metal in the catalyst was about 0.5%.

When the cross-section of the catalyst thus obtained was observed with a light microscope (magnified 5 times), it was confirmed, as schematically illustrated in FIG. 1, that the rhodium metal was omnipresent in a layer 11 in the form of a ring, which was located at a position of about 0.3 mm from the outer surface of the catalyst particle 10 and that only slight amounts of rhodium metal were present in the inside portion 12 of the catalyst particle 10. Furthermore, the rhodium metal distribution of the cross-section of the catalyst was analyzed by means of an electron probe micro analyzer (E.P.-M.A.). The result is graphically shown in FIG. 2. As is clear from the result as shown in FIG. 2, most of rhodium metal was present in the form of two peaks at positions of about 0.2 to 0.4 mm from the surface of the catalyst particle.

EXAMPLE 2

100 ml of the silica support as used in Example 1 was dipped into 36.7 ml of an aqueous solution containing 10.75 g of $MgCl_2.6H_2O$. After air drying, the support impregnated with magnesium thus obtained was dried at a temperature of 150° C. for 5 hours and, then, calcined at a temperature of 900° C. for 30 minutes in a muffle furnace.

By using the support containing magnesium thus obtained, a rhodium catalyst supported on the support was prepared in the manner as described in Example 1 above. The content of the rhodium metal in the catalyst so obtained was about 0.5%. The rhodium metal distribution of the cross-section of the catalyst particles was observed in the manner as described in Example 1 above. As a result, it was confirmed that most of the rhodium metal was supported in the neighborhood of the surface layer of the support particle as shown in FIGS. 1 and 2.

EXAMPLE 3

A rhodium catalyst containing about 0.5% of rhodium metal supported on a titania support was prepared in the manner as described in Example 1 above, except that a commercially available spherical titania ($TiO_2$) support having a diameter of 4 to 6 mm, a bulk density of 1.1 kg/liter and a surface area of 50 $m^2/g$ (manufactured by SAKAI KAGAKU CO. Japan) was used instead of a silica support.

The rhodium metal distribution of the cross-section of the catalyst particles thus obtained was observed in the manner as described in Example 1 above. As a result, it was confirmed that most of the rhodium metal was supported in the neighborhood of the surface layer of the support particle as shown in FIGS. 1 and 2.

EXAMPLE 4

A rhodium catalyst containing about 0.5% of rhodium metal supported on a silica support was prepared in the manner as described in Example 1 above, except that Davison grade #59 silica gel available from Davison Co. (U.S.A.) was used as a silica support.

The rhodium metal distribution of the cross-section of the catalyst particles thus obtained was observed in the manner as described in Example 1 above. As a result, it was confirmed that most of the rhodium metal was supported in the neighborhood of the surface layer of the particle support as shown in FIGS. 1 and 2.

EXAMPLE 5

Rhodium metal was supported on a silica support having a bulk density of 0.5733 kg/liter, a diameter of about 5 mm, a specific surface area of 150 $m^2/g$ and a pore volume of 0.55 ml/g as follows.

20.7 ml of an aqueous solution of $RhCl_3.3H_2O$ (the content of the rhodium metal in the solution was 15.68 g/liter) was placed in a 100 ml beaker. To this solution, concentrated hydrochloric acid was added to adjust the pH of the solution to 0.3 and, then, pure water was added thereto until the total volume of the solution became 38.5 ml. Into the aqueous solution of $RhCl_3$ thus prepared, 100 ml of the above-mentioned silica support was dipped and thoroughly agitated. Thus, the silica support was impregnated with an aqueous solution of $RhCl_3$.

The silica support impregnated with rhodium was then taken out of the beaker. After air drying, the support was dipped into 80 ml of a 0.4 N aqueous sodium hydroxide solution and allowed to stand for 24 hours. Thereafter, the aqueous solution was removed from the support and the support was air dried. The support was then dried at a temperature of 110° C. for 1 hour and at a temperature of 150° C. for 2 hours in a dryer.

The rhodium impregnated silica support thus dried was reduced at a temperature of 300° C. in a hydrogen atmosphere, while hydrogen gas was passed through the system. Thus, a rhodium catalyst containing rhodium metal supported on the silica support was obtained. The content of the rhodium metal in the catalyst was about 0.5%.

When the cross-section of the catalyst thus obtained was observed with a light microscope (magnified 5 times), it was confirmed, as schematically illustrated in FIG. 3, that the rhodium metal was omnipresent in a surface layer 21 of the catalyst particle 20 and that only slight amounts of rhodium metal were present in the inside portion 22 of the catalyst particle 20. Furthermore, the rhodium metal distribution of the cross-section of the catalyst was analyzed by using an electron probe micro analyzer. (E.P.M.A.). The result was graphically shown in FIG. 4. As is clear from the result as shown in FIG. 4, most of rhodium metal was present in a layer from the surface of the catalyst particles to a depth of 0.4 mm from the surface of the catalyst particles (i.e. to the depth of about 16% of the particle diameter from the surface of the catalyst particle).

EXAMPLE 6

100 ml of the silica support as used in Example 5 was dipped into 36.7 ml of an aqueous solution containing 10.75 g of $MgCl_2.6H_2O$. After air drying, the support impregnated with magnesium thus obtained was dried, at a temperature of 150° for 5 hours and, then, calcined at a temperature of 900° C. for 30 minutes in a muffle furnace.

By using the support containing magnesium thus obtained, a rodium catalyst supported on the support was prepared in the manner as described in Example 5 above. The content of the rhodium metal in the catalyst so obtained was about 0.5%. The rhodium metal distribution of the cross-section of the catalyst particles was observed in the manner as described in Example 5 above. As a result, it was confirmed that most of the rhodium metal was supported in the surface layer of the support particle as shown in FIGS. 3 and 4.

EXAMPLE 7

A rhodium catalyst having about 0.5% of rhodium metal supported on a titania support was prepared in the manner as described in Example 1 above, except that a commercially available spherical titania ($TiO_2$) support having a diameter of 4 to 6 mm, a bulk density of 1.1 kg/liter and a surface area of 50 $m^2/g$ (manufactured by SAKAI KAGAKU Co. Japan) was used instead of silica support.

The rhodium metal distribution of the cross-section of the catalyst particles thus obtained was observed in the manner as described in Example 5 above. As a result, it was confirmed that most of the rhodium metal was supported in the surface layer of the support particle as shown in FIGS. 3 and 4.

EXAMPLE 8

A rhodium catalyst having about 0.5% of rhodium metal supported on a silica support was prepared in the manner as described in Example 5 above, except that Davison grade #59 silica gel was used as a silica support.

The rhodium metal distribution of the cross-section of the catalyst particles thus obtained was observed in the manner as described in Example 5 above. As a result, it was confirmed that most of the rhodium metal was supported in the surface layer of the particle support as shown in FIGS. 3 and 4.

COMPARATIVE EXAMPLE 1

20.7 ml of an aqueous solution of $RhCl_3.3H_2O$ (the content of the rhodium metal in the solution was 15.68 g/liter) was placed in a 100 ml beaker. To this solution, pure water was added to form an aqueous solution of $RhCl_3$ having a pH of 1.2. Into the aqueous solution thus obtained, 100 ml of the silica support as used in Example 1 was dipped and thoroughly agitated. Thus, the silica support was impregnated with the aqueous solution of $RhCl_3$.

The silica support impregnated with rhodium thus obtained was dried and reduced in the manner as described in Example 1. Thus, a rhodium catalyst containing rhodium metal supported on the silica support was obtained. The content of the rhodium metal in the catalyst was about 0.5%.

Figure 5:
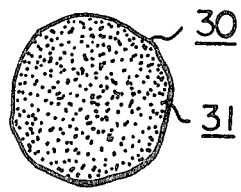
FIG. 5 is a schematical cross-sectional view illustrating the rhodium metal distribution of the catalyst obtained in Comparative Example 1 below, which is observed by using a light microscope (magnified 5 times)
Figure 6:
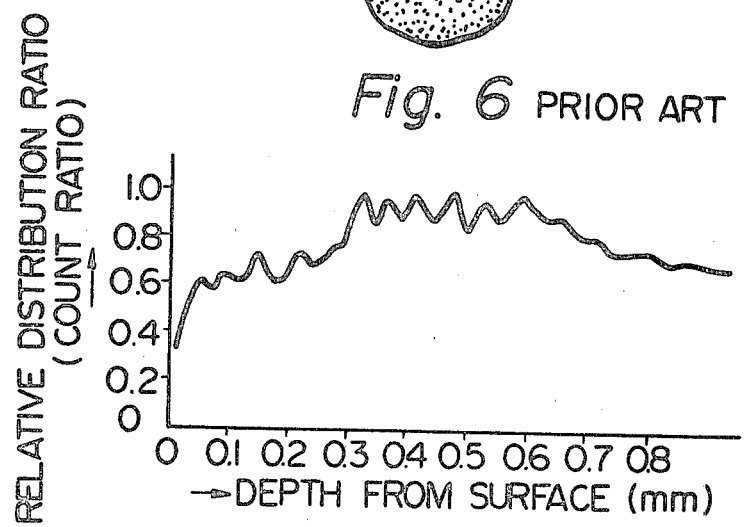
FIG. 6 is a graph illustrating the rhodium metal distribution of the catalyst obtained in Comparative Example 1 below, which is analyzed by using an electron probe micro analyzer.

When the cross-section of the catalyst thus obtained was observed with a light microscope (magnified 5 times) in the manner as described in Example 1, it was confirmed, as schematically illustrated in FIG. 5, that the rhodium metal was distributed in the entire cross-section 31 of the catalyst particle 30. The result obtained by the E.P.M.A. analysis in the manner as described in Example 1 was as shown in FIG. 6.

COMPARATIVE EXAMPLE 2

A rhodium catalyst having about 0.5% of rhodium metal supported on a titania support was prepared in the manner as described in Comparative Example 1 above, except that the commercially available spherical titania support as used in Example 3 was used instead of the silica support.

The rhodium metal distribution of the cross-section of the catalyst particles thus obtained was observed in the manner as described in Example 1 above. As a result, it was confirmed that the rhodium metal was distributed in the entire cross-section of the support as shown in FIGS. 5 and 6.

COMPARATIVE EXAMPLE 3

A rhodium catalyst having about 0.5% of rhodium metal supported on a silica support was prepared in the manner as described in Comparative Example 1 above, except that Davison grade #59 silica gel was used as a silica support.

The rhodium metal distribution of the cross-section of the catalyst particles thus obtained was observed in the manner as described in Example 1 above. As a result, it was confirmed that the rhodium metal was distributed in the entire cross-section of the support as shown in FIGS. 5 and 6.

EXAMPLE 9

By using the rhodium catalysts obtained in the above-mentioned Examples 1, 3, 4, 5, 7 and 8 as well as Comparative Examples 1 to 3, oxygen-containing compounds were prepared from synthesis gas as follows.

Into a stainless steel reaction tube having an inner diameter of 25 mm and provided with an inserted thermo-couple protect tube having an outer diameter of 6 mm, 20 ml of the rhodium catalyst particles were packed. Then, 200 liter/hr (0° C., 1 atm) of the synthesis gas containing CO and $H_2$ in a molar ratio of 2:1 was passed through the reaction tube under the reaction conditions of 300° C. and 50 $Kg/cm^2G$. Thus, oxygen-containing compounds having 2 carbon atoms were obtained. The results are shown in Table 1 below.

TABLE 1

| Rhodium Catalyst | Type of Support | Productivity (g/cat · l/hr) | Selectivity (mol %) | | |
|---|---|---|---|---|---|
| | | | Acetic Acid | Acetaldehyde | Ethyl Alcohol |
| Example 1 | Silica | 5.6 | 28.0 | 26.9 | 45.1 |
| Example 5 | " | 6.5 | 29.8 | 36.7 | 33.5 |
| Comparative Example 1 | " | 4.0 | 23.5 | 26.2 | 50.3 |
| Example 4 | Davison grade 459 silica gel | 4.5 | 25.4 | 72.5 | 2.1 |
| Example 8 | Davison grade 459 silica gel | 7.0 | 28.9 | 60.4 | 1.7 |
| Comparative Example 3 | Davison grade 459 silica gel | 2.8 | 22.0 | 76.5 | 1.5 |

TABLE 1-continued

| Rhodium Catalyst | Type of Support | Productivity (g/cat · l/hr) | Selectivity (mol %) | | |
|---|---|---|---|---|---|
| | | | Acetic Acid | Acetaldehyde | Ethyl Alcohol |
| Example 3 | Titania | 1.8 | 39.5 | 54.8 | 5.7 |
| Example 7 | " | 1.6 | 40.0 | 56.3 | 3.7 |
| Comparative Example 2 | " | 0.7 | 38.0 | 60.0 | 2.0 |

We claim:

1. A rhodium catalyst comprising active rhodium metal supported on a silica type or titania type support, said active rhodium being in the surface layer or near the surface layer of the particles of the support.

2. A rhodium catalyst as set forth in claim 1, wherein said active rhodium is present within a depth of about 0.4 mm from the surface of the particles of the support.

3. A rhodium catalyst comprising active rhodium metal supported on a silica type or titania type support, said active rhodium being in the surface layer or near the surface layer of the particles of the support and said catalyst being prepared by:
   (i) adding sodium hydroxide or potassium hydroxide to an aqueous solution of a water-soluble rhodium salt to adjust the pH of the aqueous solution to at least 10, whereby said water-soluble rhodium salt is converted to rhodium hydroxide;
   (ii) dipping a silica type or titania type support into said aqueous solution of rhodium hydroxide; and
   (iii) drying and reducing the support impregnated with rhodium hydroxide, whereby the impregnated rhodium hydroxide is reduced to rhodium metal.

4. A rhodium catalyst comprising active rhodium metal support on a silica type or titania type support, said active rhodium being in the surface layer or near the surface layer of the particles of the support and said catalyst being prepared by:
   (i) adding a mineral acid to an aqueous solution of a water-soluble rhodium salt to adjust the pH of the aqueous solution to not more than 1;
   (ii) dipping a silica type or titania type support into said aqueous solution having a pH of not more than 1;
   (iii) dipping the support impregnated with a rhodium salt into an aqueous alkaline solution containing an alkaline compound in an amount at least equivalent to theoretically neutralize the acid impregnated in the support and to theoretically convert the rhodium salt impregnated in the support into rhodium hydroxide; and,
   (iv) drying and reducing the support impregnated with the rhodium hydroxide, whereby the impregnated rhodium hydroxide is reduced to rhodium metal.

* * * * *